United States Patent Office 3,629,233
Patented Dec. 21, 1971

3,629,233
PROCESS FOR PURIFYING ERYTHROMYCIN
Shigeo Fujita and Akihiko Takatsu, Tokyo, and Kunitoyo Shibuya, Minami-Saitama-gun, Japan, assignors to Kaken Kagaku Kabushiku Kaisha, Tokyo, Japan
No Drawing. Filed Aug. 26, 1969, Ser. No. 853,209
Claims priority, application Japan, Oct. 15, 1968, 43/74,691
Int. Cl. C07c 47/18
U.S. Cl. 260—210 E                 5 Claims

ABSTRACT OF THE DISCLOSURE

Erythromycin-containing broth filtrate, or other crude aqueous solutions containing erythromycin, is passed over a porous type cation-exchange resin, the resin is washed with a dilute aqueous solution of a water-soluble alcohol, and the erythromycin is eluted from the resin with an alkaline-concentrated aqueous solution of a water-soluble alcohol. Crystals of erythromycin are obtained in high yield.

DESCRIPTION OF THE PRIOR ART

Erythromycin is a well known antibiotic which can be obtained by the fermentation of *Streptomyces erythreus*. Erythromycin has been widely used as an effective medicine for various diseases, because of its antibacterial property against various pathogenic microorganisms, such as gram-positive organisms, some gram-negative organisms, Treponema pallidum, Rickettsia and large size viruses.

As the process for isolating erythromycin, selective extraction process with organic solvents and adsorption process with active carbon have been recommended (Japanese patent publication number 6096/1956). In the former process, first extraction is carried out at about pH 9.5 by using alkyl esters of fatty acid, such as ethyl acetate and amyl acetate, chloroform, ethylene dichloride or the like. Then, erythromycin is re-extracted from the extraction solution by using water at about pH 5.5. Crude erythromycin can be isolated by evaporating the thus-obtained extract. In the latter process, erythromycin is adsorbed by active carbon which was pretreated with acetic acid, then eluted with butanol. Crude erythromycin can be isolated by concentrating the thus-obtained butanol solution.

In the purification of thus-obtained crude erythromycin, several processes, such as solvent extraction or silica gel chromatography, have been proposed. In industrial use, an extraction process with organic solvents has been practically applied. However, this conventional process has many disadvantages, such as, for example, large amount of solvent being required, complicated operation being required depending on the fermentation condition of broth filtrate, poor purification yield and the like.

Recently, in the field of antibiotic industry, adsorption process with ion-exchange resins has been recognized as an economical purification process, and this process has been commercially applied for the production of streptomycin and many other basic water soluble antibiotics.

However, for the purification of macrolide antibiotics such as erythromycin, this process has not been successfully applied in practice, and only a basic research with regard to erythromycin was reported by G. V. Samsonov and L. P. Fleer [Chem. Abst. 58, 6649–6650 (1963)].

According to Samsonov's report, erythromycin was adsorbed by cation-exchange resin at first (by using R—SO$_3$H type or R—CO$_2$H type resins), then eluted with an alkaline aqueous solution of acetone or an ammonia-boric acid buffer solution. Under the conditions which appeared in this report, however, it was recognized that the resins were apt to be damaged by acetone, and the purification effect attained by the ammonia-boric acid buffer solution was small. Therefore, the Samsonov's process would not be a satisfactory industrial process.

SUMMARY OF THE INVENTION

The present invention relates to a process for obtaining purified erythromycin from erythromycin-containing broth filtrate, or other crude aqueous solutions containing erythromycin, by using a porous type cation exchange resin. The erythromycin is eluted from the resin with an alkaline-concentrated aqueous solution of a water-soluble alcohol.

DETAILED DESCRIPTION OF THE INVENTION

A main object of this invention is to provide an economical and industrially beneficial process for obtaining purified erythromycin in high yield from erythromycin-containing broth filtrate and other crude preparations containing erythromycin. Another object of this invention is to provide an economical process for obtaining erythromycin of high purity which comprises contacting a crude preparation of erythromycin with an ion-exchange resin, subjecting erythromycin to adsorption by said resin, and conveniently eluting the adsorbed erythromycin from said resin. Further, another object of this invention is to provide an economical process for obtaining erythromycin of high purity which comprises subjecting a crude preparation of erythromycin to adsorption by an ion-exchange resin, and eluting the adsorbed erythromycin from said resin wihout damaging said resin.

The present invention was derived from the results of numerous investigations about the adsorption and elution of erythromycin on various sorts of ion-exchange resin as follows:

(a) Adsorption of erythromycin by various cation-exchange resins

Adsorption of erythromycin by various cation-exchange resins was examined by the following procedure: A broth filtrate containing 1000 γ/ml. of erythromycin was adjusted to pH 6.5 by hydrochloric acid and passed through the column of various resins at a space velocity of 2 hr.$^{-1}$. ("Space velocity" is defined as follows:

$$\text{space velocity} = S = \frac{\text{volume of feed/time}}{\text{void volume}}$$

The time unit is hour.)
The results are shown in Table 1.

TABLE 1

| Sort of ion-exchange resin | Trade name | Form | Adsorbed erythromycin (mg./ml. of resin) |
|---|---|---|---|
| Lower crosslinking grade strong acidic resin (sulfonic acid type). | Diaion PK-204 | NH$_4^+$ | 12.0 |
| | Diaion PK-208 | NH$_4^+$ | 11.6 |
| | Dowex 50W-X4 | NH$_4^+$ | 11.7 |
| | Amberlite XE-100 | NH$_4^+$ | 7.5 |
| | Diaion SK-104 | NH$_4^+$ | 7.5 |
| | Duolite C-25 [1] | NH$_4^+$ | 8.2 |
| | Lewatit SP-100 | NH$_4^+$ | 7.6 |
| Higher crosslinking grade strong acidic resin (sulfonic acid type). | Dowex 50W-X8 | NH$_4^+$ | 0.86 |
| Weak acidic resin (carboxylic acid type). | Duolite CS-101 | NH$_4^+$ | 0 |
| | Amberlite IRC-50 | NH$_4^+$ | 0 |
| | ...do... | pH 6.0 [2] | 7.4 |
| | ...do... | pH 6.5 [2] | 5.1 |
| Porous type resin for decolorization. | Duolite S-30 | NH$_4^+$ | [3] 7.1 |

[1] 5.5% crosslinkage with divinylbenzene.
[2] Bufferized.
[3] Coloring matter was strongly adsorbed.

Note.—The same results were obtained by Na$^+$ type resins as in the case of NH$_4^+$ type resins used.

From these results, it was recognized that erythromycin was scarcely adsorbed by salt-form (for example, NH$_4^+$ form and Na$^+$ form) cation-exchange resins of higher crosslinking grade sulfonic acid type polystyrene resins and carboxylic type methacrylate resins, but it was effectively adsorbed by lower crosslinking grade sulfonic acid type cation-exchange resins made from polystyrene, such as for example, NH$_4^+$ form or Na$^+$ form of Diaion PK-204, Diaion PK-208 (Trademark of Mitsubishi Chemical Inc., Ltd.) and Dowex 50W-X4 (Trademark of the Dow Chemical Co.). Cation exchange resins will vary in porosity depending upon the amount of crosslinkage with divinylbenzene. Thus, the greater the crosslinkage, the lower the porosity. For example, in Table I, supra, Dowex 50W-X4 has a crosslinkage of 4% divinylbenzene. This is considered in the resin art as a highly porous resin. On the other hand, a resin having a crosslinkage of 12% divinylbenzene is considered by the resin art to be a low porosity resin. Though the precise level of crosslinkage in Amberlite IRC-50 is not known, this resin is a macroreticular resin possessing a modest porosity consisting of large pores.

As shown in Table 1, supra, a resin having a crosslinkage of 8% divinylbenzene (Dowex 50W-X8) adsorbs erythromycin poorly, whereas a resin with 4% crosslinkage (Dowex 50W-X4) adsorbs erythromycin very well. Further, Amberlite IRC-50 and Duolite C-25 which have a "modest porosity" still adsorb erythromycin fairly well but not as good as the highly porous resins. Thus, the term "porous type cation-exchange resin", as used herein, is well understood in the resin art, and as shown above, encompasses a resin having from about 1 to about 5.5% crosslinkage.

When carboxylic acid type cation-exchange resins made from methacrylate, for example, Amberlite IRC-50 (Trademark of Rohm & Haas Co.) and Duolite CS-101 (Trademark of Chemical Process Co.) were used, the maximum adsorption capacity of the resins were observed at around pH 6.0. The importance of pH control during the purification processing would be also recognized from the data of Table 2 which proves that erythromycin is quite unstable at the pH of under 5.5.

TABLE 2

| pH | 5.0 | 5.5 | 6.0 | 6.5 |
|---|---|---|---|---|
| Remaining percentage of erythromycin after standing 48 hrs. at room temperature | 15.7 | 70.8 | 83.3 | 100 |

Erythromycin also can be adsorbed by Duolite S-30, one of the porous type resin for decolorization use. However, the purification effect of the resin was inferior to the others, because of its great adsorption property for coloring matters. Therefore, it was unsuitable for practical use.

(b) Elution condition of adsorbed erythromycin

Various experiments were made for investigating the elution condition of adsorbed erythromycin as shown in Table 3. Experimental procedure: Ten parts of broth filtrate containing erythromycin in the amount of 1500 γ/ml. was loaded on 1 part of Diaion PK-208 (sulfonic acid type cation-exchange resin) in a column. The adsorbed erythromycin was eluted with 5 parts of various solvents and measured the percentage of eluted erythromycin.

TABLE 3

| Elution solvent: | Percentage of eluted erythromycin |
|---|---|
| 0.25 N ammonia | 37.9 |
| 1 M sodium chloride | 8.1 |
| 0.5 M acetic acid buffer solution (pH 6.0) | 0 |
| 0.5 M phosphoric acid buffer solution (pH 6.0) | 0 |
| 0.5 M boric acid buffer solution (pH 10.0) | 26.9 |
| 30% methanol | 0 |
| 60% methanol | 0 |
| 60% ethanol | 0 |
| 0.25 N ammoniacal 60% methanol | 71.3 |
| 0.25 N ammoniacal 60% ethanol | 69.0 |
| 0.25 N ammoniacal 60% isopropanol | 71.0 |
| 0.25 N ammoniacal 60% acetone | 65.0 |
| 0.25 N ammoniacal 90% methanol | 89.0 |
| 0.25 N ammoniacal 90% ethanol | 85.8 |
| 0.25 N ammoniacal 90% isopropanol | 86.0 |
| 0.25 N ammoniacal 90% acetone | 58.2 |

Through these experiments, it was recognized that alkaline aqueous solution of water soluble alcohols had effects for the purpose of eluting erythromycin superior to acetone, aqueous solution of salts or the like.

It was also observed that by pre-washing the resin with a dilute aqueous solution of a water soluble alcohol, contaminated impurities in the erythromycin preparation, such as coloring matters, could be effectively removed without elution of erythromycin.

The ion-exchange resins were apt to be damaged by the application of concentrated acetone as the elution solvent, and in this case, only a poor elution efficiency of erythromycin could be obtained. However, when water soluble alcohols, for example, methanol, ethanol, isopropanol and butanol were used as the elution solvents, elution efficiencies of erythromycin were excellent at rather high concentration of the solvents. Moreover, in this case, resins were scarcely damaged and erythromycin could be effectively purified in high yield. According to the present invention, a novel process for purifying erythromycin is presented, wherein said process comprises contacting erythromycin containing broth filtrate, or other crude preparation containing erythromycin, with a porous type cation-exchange resin, subjecting erythromycin to adsorption by the resin, and after washing the resin with a dilute aqueous solution of a water soluble alcohol, eluting erythromycin from the resin with alkaline concentrated aqueous solution of a water soluble alcohol.

The water soluble alcohols, which are used in the process of this invention, may be the alcohols which are soluble in water in any proportion, and preferably being lower fatty alcohols, for example, methanol, ethanol, propanol, isopropanol and butanol. Dilute alcohols which are used advantageously to pre-wash the ion-exchange resin may have concentration of not more than 60%, and preferably being in a range of 30–60%. Ammoniacal solution of alcohols are preferably used as the alkaline concentrated alcohols for eluting erythromycin from resins, wherein appropriate concentration of ammonia is varied, depending upon the type of ion-exchange resin used, but generally, the concentration of ammonia may be in a range of 0.01–5 N, and preferably being in a range of 0.05–1 N. The alcohol concentration of the elution solvents may be not less than 50%, and preferably being in a range of 60–95%. By evaporating the thus-obtained eluate to the appropriate concentration for the crystallization, erythromycin crystals of high purity can be obtained in high yield.

The embodiments of the invention in which an exclusive property or privilege is claimed are defined as follows:

Example 1

One liter of broth filtrate containing 1250 γ/ml. of erythromycin was treated with dilute hydrochloric acid to adjust pH 7.0, and passed through a column packed with 400 ml. of Diaion PK–208 ($NH_4^+$ form, this resin is one of the porous type cation-exchange resin of sulfonic acid type made from polystyrene) at a space velocity of 2 hr.$^{-1}$. The adsorption efficiency of erythromycin was about 100%. After washing the column with water, 400 ml. of 30% aqueous solution of methanol and 100 ml. of 60% aqueous solution of methanol were passed through the column successively at the space velocity of 1 hr.$^{-1}$, then the adsorbed erythromycin in the resin was eluted with 400 ml. of 0.25 N ammoniacal 90% aqueous solution of methanol at the space velocity of 0.2 hr.$^{-1}$. 190 ml. of the eluate, which contains erythromycin in high concentration, was evaporated to 70 ml. in vacuo at 50° C. 10 ml. of water was added and the mixture was evaporating the filtrate and cooling. The total yield of ditional crystals of erythromycin were obtained by cooled. White crystals of erythromycin precipitated. Additional the crystals based on the amount of erythromycin in the broth filtrate was 70% and its activity was 900 γ/mg.

Example 2

A column was packed with 150 ml. of Amberlite IRC–50 (H$^+$ form), a methacrylate series carboxylic acid type cation-exchange resin, and adjusted to a pH of 6.0 by passing through 1 M of buffer solution which was made from citric acid and sodium phosphate.

1.5 liter of broth filtrate containing 1000 γ/ml. of erythromycin was passed through the column at the space velocity of 2 hr.$^{-1}$. 7.5 mg. of erythromycin was adsorbed per ml. of the resin (adsorption efficiency was 75%).

After washing the column with water, 150 ml. of 30% aqueous solution of methanol and 30 ml. of 60% aqueous solution of methanol were passed through the column successively at the space velocity of 1 hr.$^{-1}$. The adsorbed erythromycin in the resin was eluted with 1 N ammoniacal 80% aqueous solution of methanol at the space velocity of 0.2 hr.$^{-1}$. 300 ml. of the eluate was treated with hydrochloric acid to pH 6.5 and evaporated to 40 ml. in vacuo at 50° C. The pH was adjusted to 9.0 with a 1 M aqueous solution of sodium carbonate and the solution allowed to cool to induce crystallization of erythromycin. The total yield of the crystal based on the amount of erythromycin in the broth filtrate was 45%, and activity was 940 γ/mg.

Example 3

A broth filtrate containing 1200 γ/ml. of erythromycin was prepared. 500 ml. of the broth filtrate was passed through a column packed with Dowex 50W–X4 (Na$^+$ form, a sort of large porous type sulfonic acid type resins), at the space velocity of 2 hr.$^{-1}$. Erythromycin was adsorbed by the resin at an efficiency of about 100%. After washing the column with water, 50 ml. of a 30% aqueous solution of isopropanol was passed over the resin, then, the adsorbed erythromycin in the resin was eluted with 0.25 N ammoniacal 60% aqueous solution of isopropanol at the space velocity of 0.2 hr.$^{-1}$. The eluate, about 75 ml., was condensed to about one-third its volume in vacuo, and the pH was adjusted to 9.5 with 1 M sodium carbonate after adding 40 ml. of water. This solution was extracted twice with 10 ml. of methylene chloride and the extract was condensed and cooled to 0° C. to induce crystallization of erythromycin. The yield of crystal based on the amount of erythromycin in the broth filtrate was 55%, and the activity was 930 γ/mg.

We claim:
1. An improved process for recovering erythromycin from erythromycin-containing broth filtrate, or from other crude aqueous solutions containing erythromycin which comprises:
    (1) passing said crude broth filtrate or aqueous solution containing erythromycin over a porous type cation exchange resin having from about 1 to about 5.5% crosslinkage at a pH of about 5.5 to 7.0 to adsorb the erythromycin, and,
    (2) eluting erythromycin from said resin with an ammoniacal solution of a water soluble alcohol of from 1 to 4 carbon atoms, inclusive.
2. A process, according to claim 1, wherein the water soluble alcohol is methanol, ethanol, propanol, isopropanol or butanol.
3. A process, according to claim 1, wherein the resin is washed prior to elution with a dilute aqueous solution of a water soluble alcohol of from 1 to 4 carbon atoms, inclusive.
4. A process, according to claim 1, wherein erythromycin is eluted from the resin with an ammoniacal solution of a water soluble alcohol of from 1 to 4 carbon atoms, inclusive, said solution having an alcohol concentration in a range of 60–95%.
5. A process, according to claim 1, which comprises:
    (1) passing an erythromycin broth filtrate over a porous type cation exchange resin having from about 1 to about 5.5% crosslinkage at a pH of about 6.0 to 7.0,
    (2) washing said resin with water, 30% aqueous solution of methanol, and 60% aqueous solution of methanol,
    (3) eluting erythromycin from said resin with a 0.25 N ammoniacal 90% aqueous solution of methanol to give an eluate containing erythromycin, and,
    (4) recovering erythromycin from said eluate.

References Cited

UNITED STATES PATENTS

| | | | |
|---|---|---|---|
| 2,827,417 | 3/1958 | Friedman et al. | 260—210 AB |
| 2,970,053 | 1/1961 | Martin et al. | 260—210 E |
| 3,179,652 | 4/1965 | Celmer | 260—210 E |
| 3,221,008 | 11/1965 | Wolf et al. | 260—210 AB |

LEWIS GOTTS Primary Examiner

J. R. BROWN, Assistant Examiner

UNITED STATES PATENT OFFICE
CERTIFICATE OF CORRECTION

Patent No. 3,629,233      Dated December 21, 1971

Inventor(s) Shigeo Fujita, Akihiko Takatsu & Kunitoyo Shibuya

It is certified that error appears in the above-identified patent and that said Letters Patent are hereby corrected as shown below:

Column 5, lines 29 - 33, for "evaporating the filtrate and cooling. The total yield of ditional crystals of erythromycin were obtained by cooled. White crystals of erythromycin precipitated. Ad- the crystals based on the amount of erythromycin in the broth filtrate was 70% and its activity was 900 $\gamma$/mg." read -- cooled. White crystals of erythromycin precipitated. Additional crystals of erythromycin were obtained by evaporating the filtrate and cooling. The total yield of the crystals based on the amount of erythromycin in the broth filtrate was 70% and its activity was 900 $\gamma$/mg. --.

Signed and sealed this 6th day June 1972.

(SEAL)
Attest:

EDWARD M. FLETCHER, JR.　　　ROBERT GOTTSCHALK
Attesting Officer　　　　　　Commissioner of Patents